United States Patent
Iwasa

(10) Patent No.: US 6,443,636 B1
(45) Date of Patent: Sep. 3, 2002

(54) STOP DEVICE

(75) Inventor: Kazuyuki Iwasa, Hino (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/377,798

(22) Filed: Aug. 20, 1999

(30) Foreign Application Priority Data

Aug. 24, 1998 (JP) ........................................ H10-237508

(51) Int. Cl.[7] .................................................. G03B 9/02
(52) U.S. Cl. ..................................................... 396/505
(58) Field of Search ............................... 396/348, 133, 396/72, 505; 359/826, 701

(56) References Cited

U.S. PATENT DOCUMENTS

| | | | | |
|---|---|---|---|---|
| 5,376,983 A | * | 12/1994 | Yamazaki et al. | 396/72 |
| 5,392,160 A | * | 2/1995 | Satoh et al. | 359/695 |
| 5,485,315 A | * | 1/1996 | Nomura et al. | 359/701 |
| 5,589,987 A | * | 12/1996 | Tanaka | 359/701 |
| 5,758,205 A | * | 5/1998 | Hara et al. | 396/133 |
| 5,966,249 A | * | 10/1999 | Aoki | 359/699 |
| 6,028,718 A | * | 2/2000 | Nakayama et al. | 359/701 |

FOREIGN PATENT DOCUMENTS

JP          5-188274          7/1993

* cited by examiner

*Primary Examiner*—Christopher Mahoney
(74) *Attorney, Agent, or Firm*—Ostrolenk, Faber, Gerb & Soffen, LLP

(57) ABSTRACT

A stop device of the present invention mainly comprises a cam frame M (frame member), a flare stop (stop member) and a key ring for guiding the linear movement of the flare stop. When a lens barrel is collapsed, the cam frame M is driven linearly, whereas then the lens barrel is zoomed, it is rotated as well as advanced and retracted. The flare stop is accommodated in the vicinity of the frame M in a collapsed state, and the arm sections of the flare stop are reliably secured by the key ring and the cam frame M in a photographing state. Consequently, according to the stop device, the stop device can obtain a good flare stop state by securing a proper distance between itself and the cam frame M. Further, the space occupied by the stop device can be reduced and the lens barrel to which the stop device is assembled can be reduced in size.

24 Claims, 8 Drawing Sheets

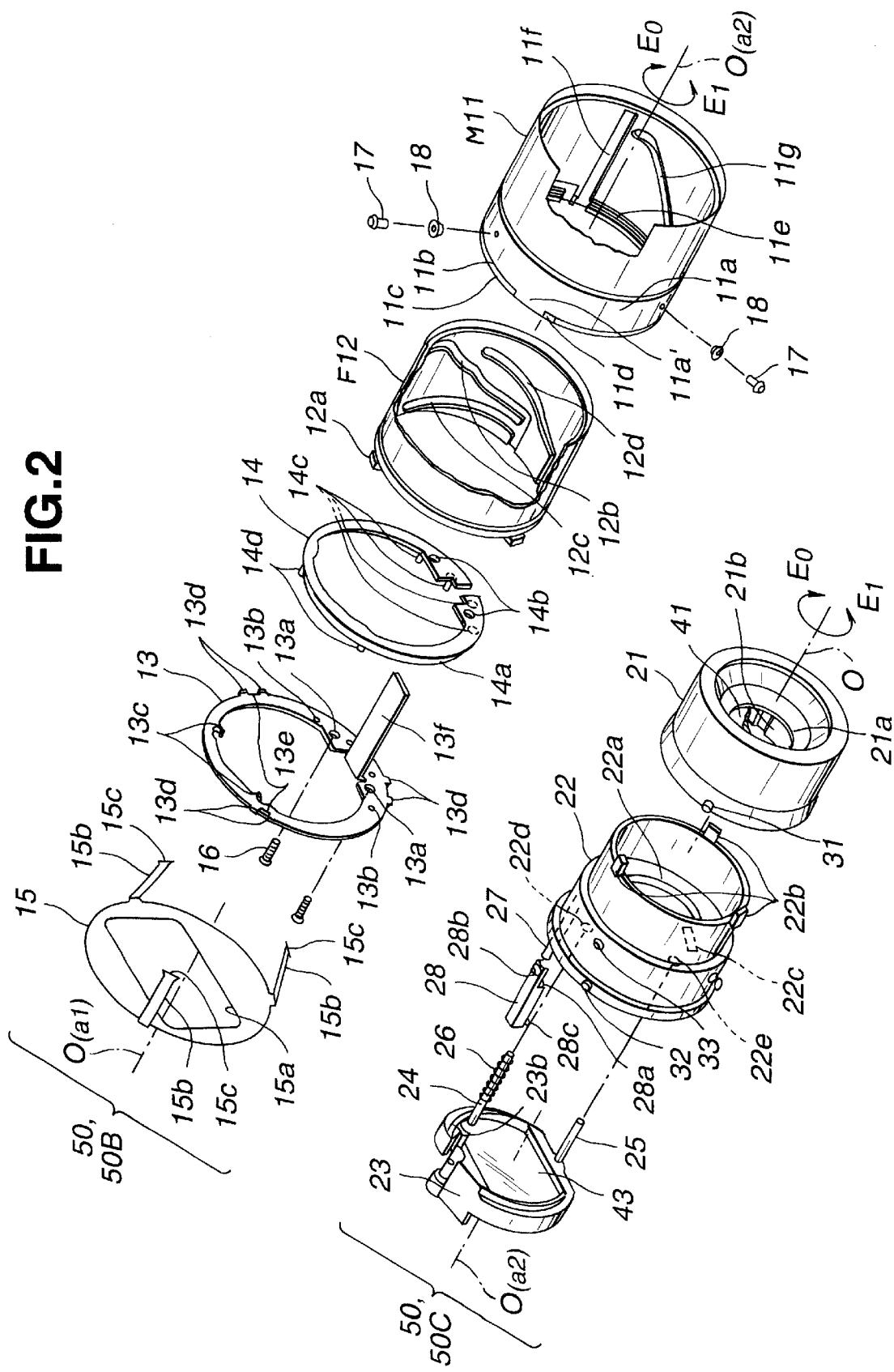

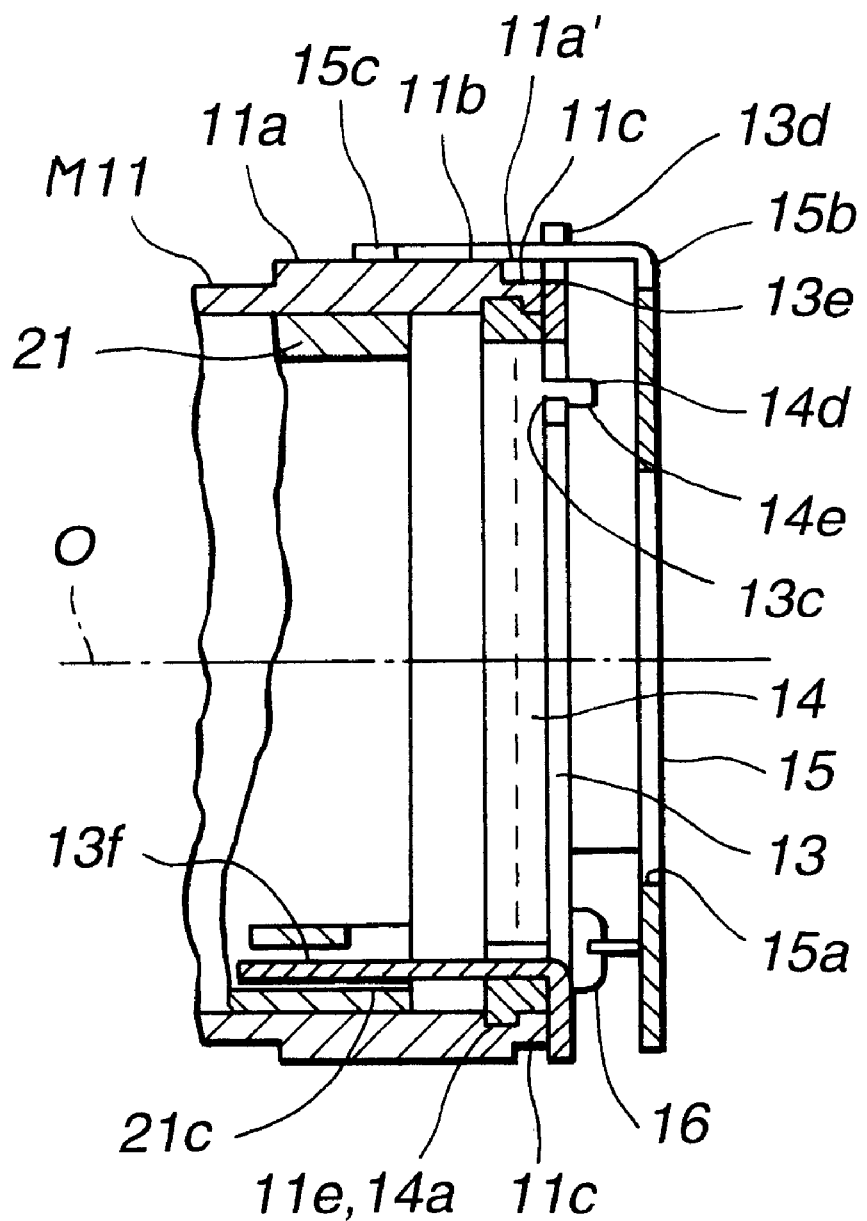

STOP DEVICE

BACKGROUND OF THE INVENTION

1. Field of the Invention

The present invention relates to a stop device for use in optical equipment.

2. Description of the Related Art

Conventionally, a lens barrel using a flare stop is known as proposed in Japanese Unexamined Patent Publication No. 5-188274. The sectional views of FIGS. 8A, 8B and 8C show the operating state of the flare stop. The flare stop device of the lens barrel comprises a third lens barrel 60, which is advanced and retracted to and from a fixed frame 101 by a zooming operation and a collapsing operation, a float key 80, whose distance in an optical-axis direction changes with respect to the fixed frame 101 and the third lens barrel 60 in the zooming operation and the collapsing operation, a flare stop 100, which is locked to the float key 80 and interposed between the fixed frame 101 and the third lens barrel 60, and so forth.

The flare stop 100 is a thin disc having a flare stop opening 100c formed at the center thereof. The flare stop 100 includes an annular peripheral wall section 100b formed at the outer peripheral portion thereof in a forward direction, an elastic piece 100a extending in the forward direction from the trisected position of the front surface of the annular peripheral wall section 100b, and a locking pawl 100d formed at the outer peripheral portion of the extreme end of the mounting piece 100a.

The flare stop 100 is mounted in such a manner that it is engaged with the float key 80 along the inner peripheral wall 80f of the float key 80 from the rear side thereof so as not to interfere with the third lens barrel 60, and the locking pawl 100d of the mounting piece 100a is elastically inserted into the rectangular engaging hole 80e of the float key 80. As a result, the flare stop 100 can move in the optical-axis direction by the length of the engaging hole 80e rearward of the float key 80.

The operation of the flare stop 100 in zooming and collapsing will be described with reference to FIGS. 8A, 8B and 8C. First, when respective lens groups are retracted, the flare stop 100 is in a state shown in FIG. 8A. In the collapsed state, the flare stop 100 is abutted against the mask front side 101a of a main body 101. The locking pawl 100d of the flare stop 100 is located at a position near to the front end of the engaging hole 80e of the float key 80.

Next, when the respective lens groups are driven to a wide-angle state, the flare stop 100 is in a state shown in FIG. 8B. In this state, the third lens barrel 60 relatively moves backward by a distance F2 in the optical-axis direction with respect to the float key 80 while the float key 80 moves in the optical-axis direction. With this movement, the rear end surface 61a of a lens support frame 61 which is engaged with the third lens barrel 60 is abutted against the front end surface 100f of the flare stop 100, thereby pushing out the flare stop 100 toward the rear side of the optical-axis.

Next, when the respective lens groups are zoomed up to a telephoto state, the flare stop 100 is in a state shown in FIG. 8C. In this state, the third lens barrel 60 moves by a predetermined distance in the optical-axis direction. However, the relative positional relationship between the float key 80 and the flare stop 100 is not changed from the wide-angle state because the movement of the third lens barrel 60 does not physically affect the flare stop 100. Then, the flare stop opening 100c is located at a midway position between a third lens group L3 and the mask front side 101a and doe not interfere with an effective light beam OP in the telephoto state.

However, in the flare stop device of the lens barrel in Japanese Unexamined Patent Publication No. 5-188274 mentioned above, the flare stop 100 is held to the float key 80 by the elastic force of the mounting piece 100a. Thus, the locking pawl 100d of the flare stop 100 can be moved at least within the range of the engaging hole 80e of the float key 80 between, for example, the wide-angle state in FIG. 8B and the telephoto state in FIG. 8C. The flare stop 100 itself has little possibility that it moves because it is composed of a light member. However, when strong shock is applied to the main body, there is a possibility that the locking pawl 100d will be released from the confines of the engaging hole 80e, i.e., from the range in which it normally moves.

SUMMARY OF THE INVENTION

An object of the present invention, which was made to overcome the above disadvantage, is to provide a stop device which can accurately maintain the relative distance between the stop member and the frame member for supporting it and which further occupies a small space and is effective to reduce the size of the lens barrel to which the stop device is assembled.

A stop device of the present invention comprises a stop member having arm sections including convex portions at the extreme ends thereof and permitting a desired photographing light beam to pass therethrough; and a frame member having a first sliding surface on which the convex portions can slide, a second sliding surface, on which the convex portions can slide, having a step with respect to the first sliding surface and an inclined surface for continuously connecting the sliding surfaces and capable of moving in the optical-axis direction of the lens barrel about the optical-axis thereof, wherein the stop member slides on the first sliding surface when the lens barrel moves from a collapsed position to a photographing preparation position, slides and falls on the inclined surface and reaches the second sliding surface when the lens barrel moves from the photographing preparation position to a first photographing magnification position, and slides on the second sliding surface when the lens barrel moves from the first photographing magnification position to a second photographing magnification position.

Other features and advantages of the present invention will be apparent form the following description when taken in conjunction with the accompanying drawings.

BRIEF DESCRIPTION OF THE DRAWINGS

FIG. 2 is an exploded perspective view of a lens group drive system and a lens group frame section constituting the lens barrel to which the stop device, which is the embodiment of the present invention, is assembled;

FIG. 7 is a longitudinal sectional view of the periphery of the movable flare stop mounting section of the lens barrel of the embodiment;

DETAILED DESCRIPTION OF THE PREFERRED EMBODIMENTS

An embodiment of the present invention will be described with reference to the accompanying drawings.

Figure 1:
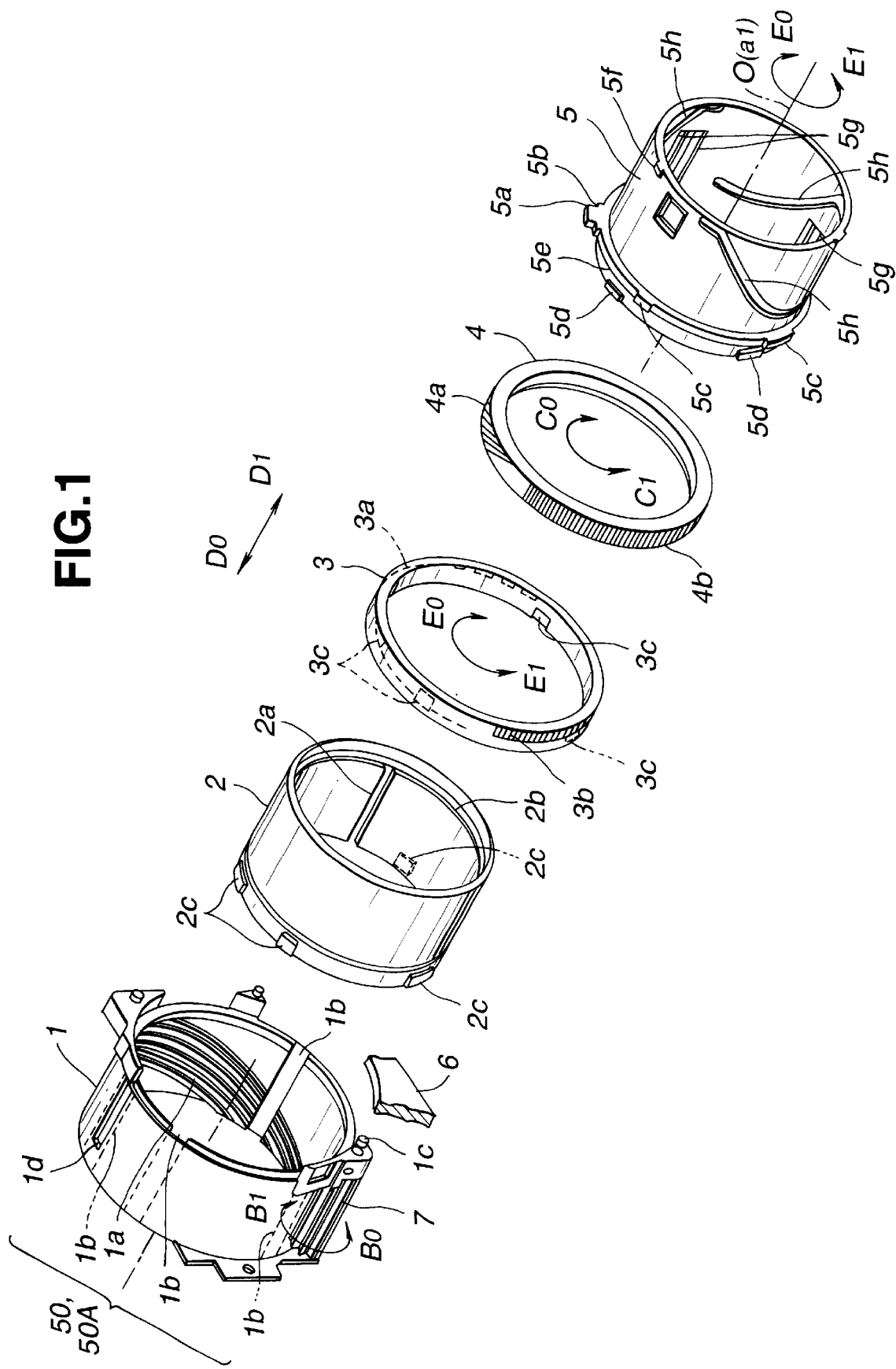
FIG. 1 is an exploded perspective view of a collapsible barrel drive system constituting a lens barrel to which a stop device, which is an embodiment of the present invention, is assembled.
Figure 3A:
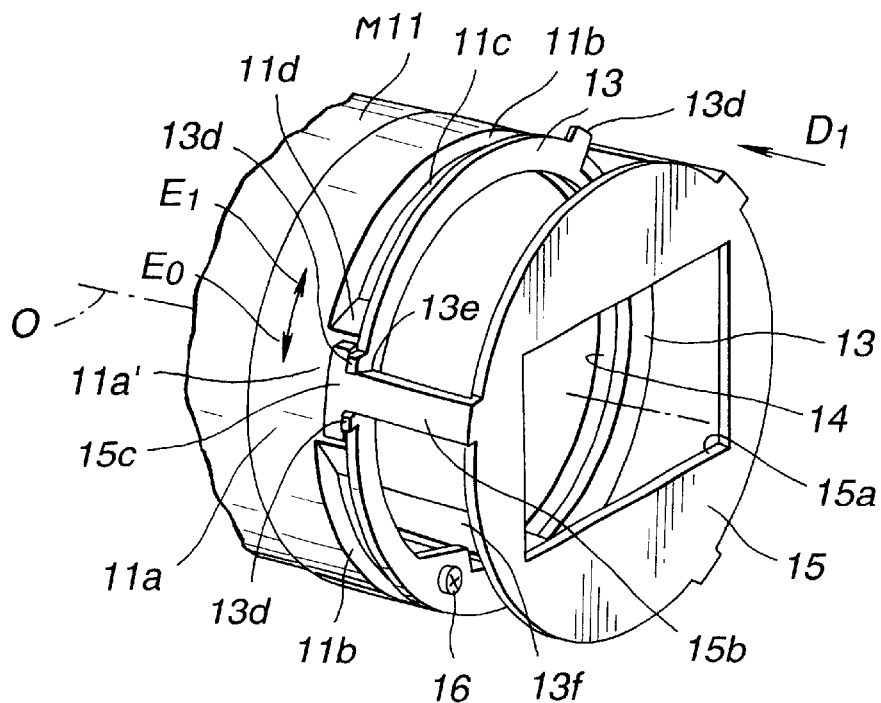
FIG. 3A is a perspective view of the periphery of the movable flare stop mounting section of the lens barrel of the embodiment and shows a state before a cam frame M is rotated.
Figure 3B:
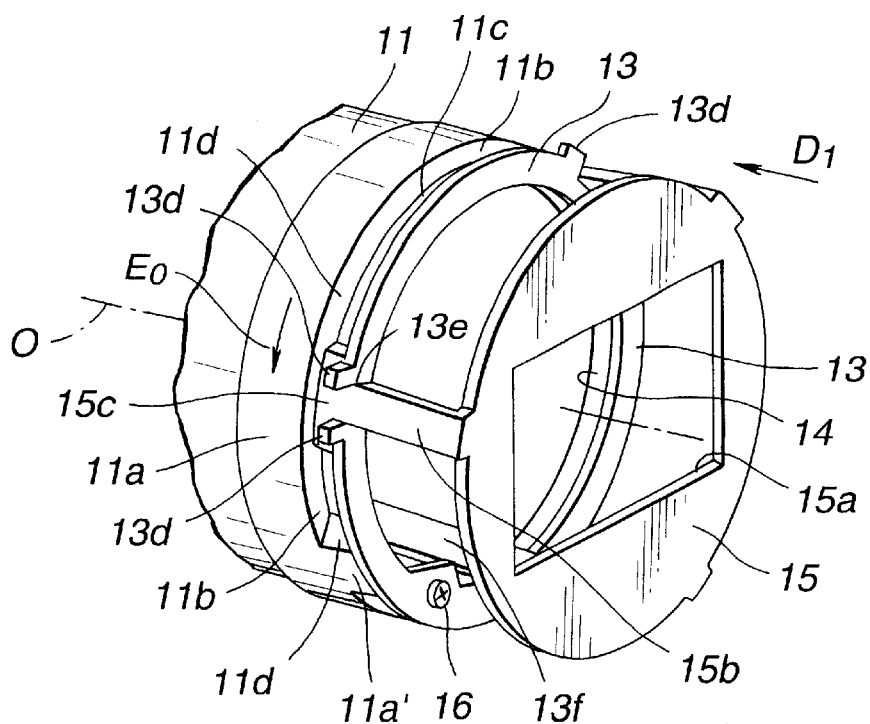
FIG. 3B is a perspective view of the periphery of the movable flare stop mounting section of the lens barrel of the embodiment and shows a state after the cam frame M is rotated.
Figure 4:
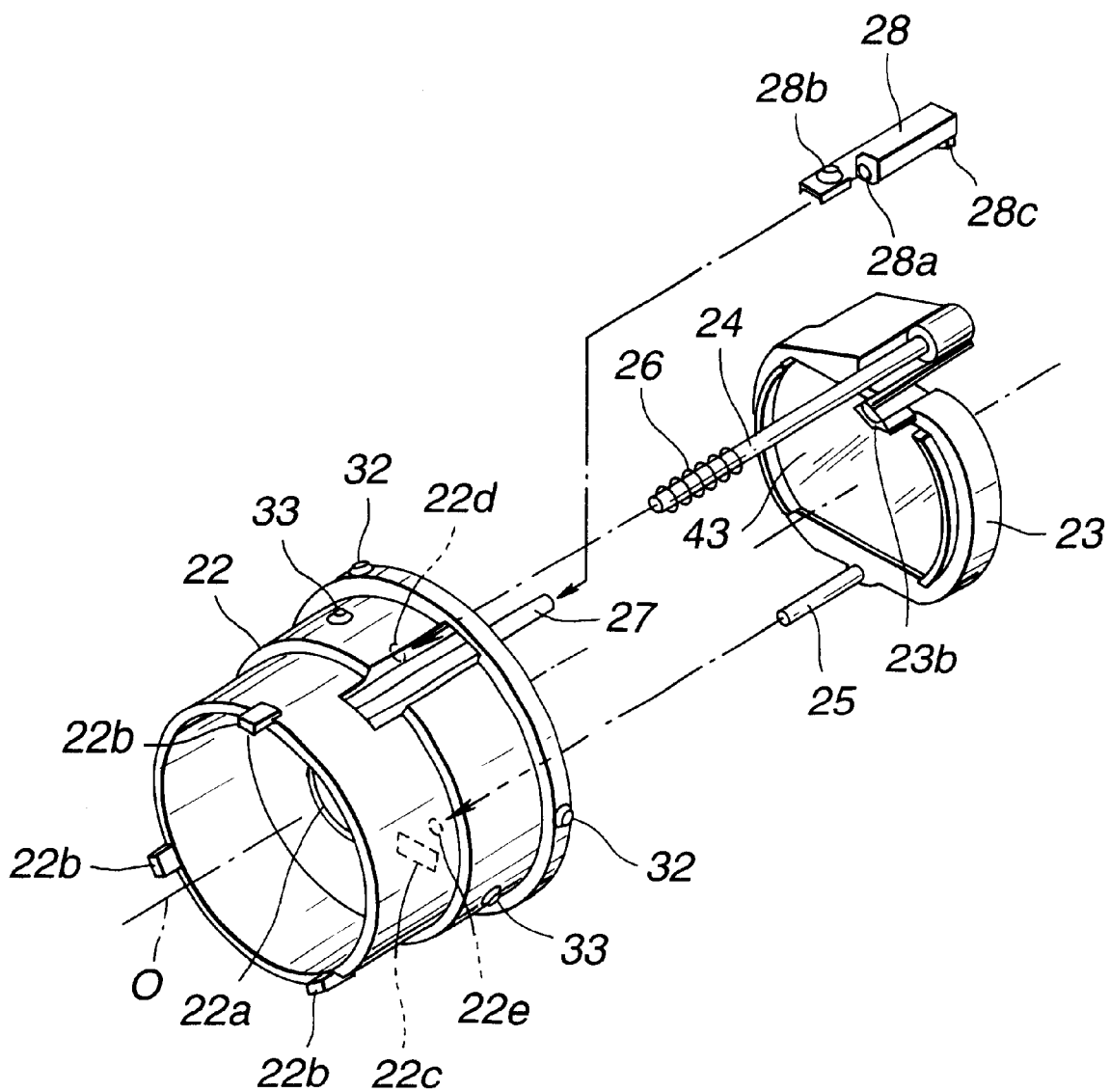
FIG. 4 is an exploded perspective view of the second and third grope frames and the like of the lens barrel of the embodiment.
Figure 5:
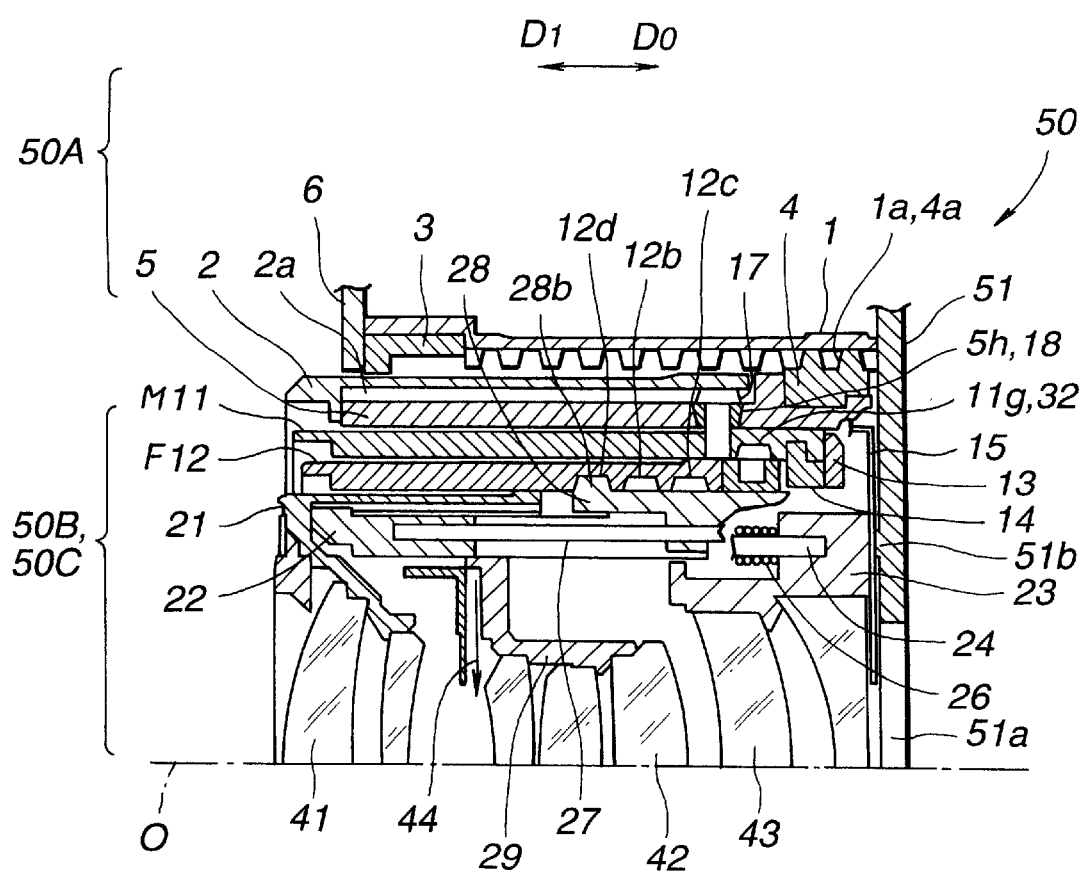
FIG. 5 is a longitudinal sectional view of the lens barrel of the embodiment and shows a collapsed state.
Figure 6:
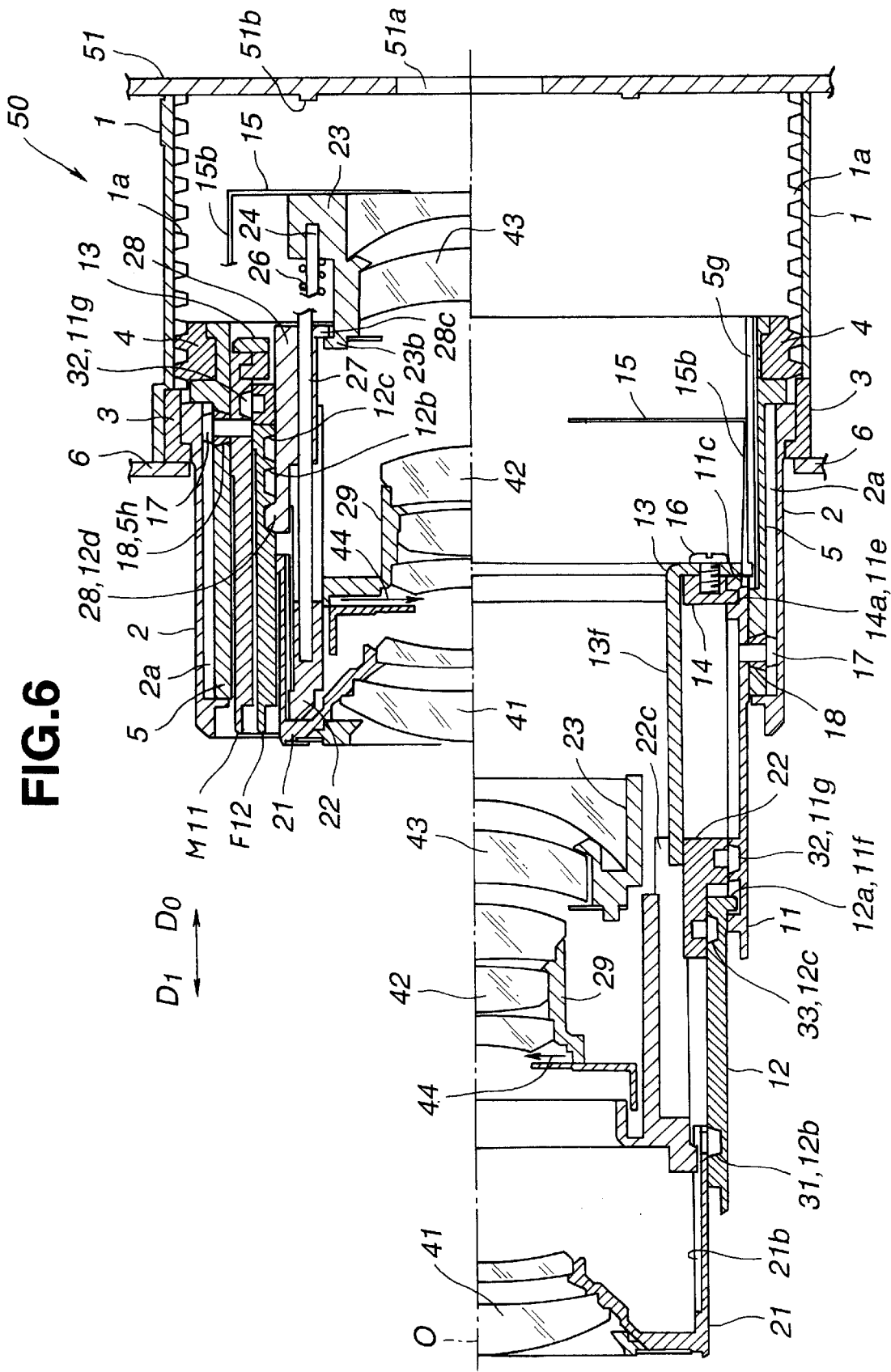
FIG. 6 is a longitudinal sectional view of the lens barrel of the embodiment and shows a photographing preparation state and a wide-angle state in the upper-half section thereof and a telephoto state in the lower-half section thereof.
Figure 8A:
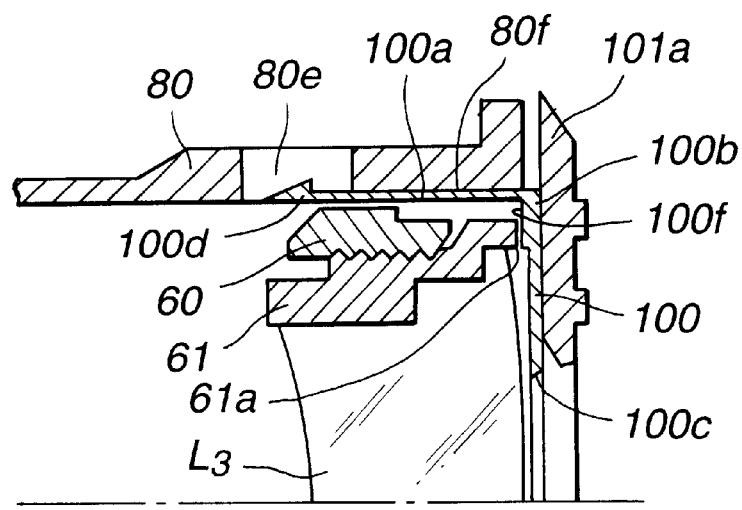
FIG. 8A is a longitudinal sectional view of the periphery of a flare stop device assembled to a conventional lens barrel and shows a collapsed state.
Figure 8B:
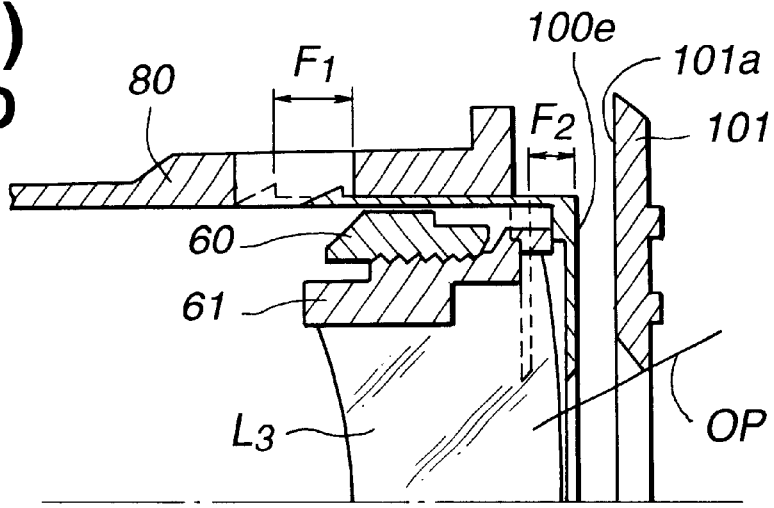
FIG. 8B is a longitudinal sectional view of the periphery of the flare stop device assembled to the conventional lens barrel and shows a wide-angle state.
Figure 8C:
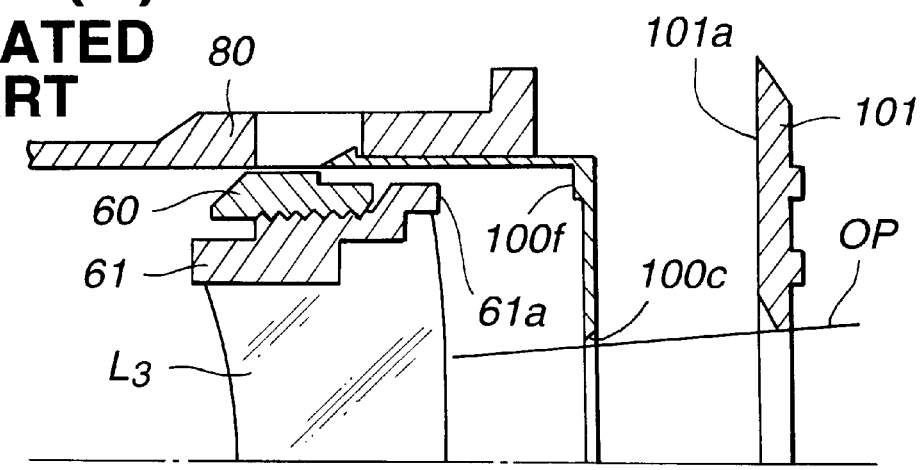
FIG. 8C a longitudinal sectional view of the periphery of the flare stop device assembled to the conventional lens barrel and shows a wide-angle state.

FIGS. 1 and 2 are exploded perspective views of a lens barrel 50 to which a stop device as an embodiment of the present invention is assembled, FIG. 3A and FIG. 3B are perspective views of the periphery of a movable flare stop mounting section and FIG. 4 is an exploded perspective view of second and third frames and the like. FIGS. 5 and 6 are longitudinal sectional views of the lens barrel 1 in respective states, wherein FIG. 5 shows a collapsed state and FIG. 6 shows a photographing preparation state and a wide-angle state in the upper-half section thereof and a telephoto state in the lower-half section thereof. FIG. 7 is a longitudinal sectional view of the movable flare stop mounting section. Note that the respective members in the perspective views of FIGS. 1 and 2 are not always shown in the attitudes in a rotating direction when they are assembled in order to clarify the shapes thereof.

A lens barrel 50 comprises a collapsible barrel drive system 50A, a lens group drive system 50B and a lens group frame section 50C. The collapsible barrel drive system 50A advances and retracts the lens barrel 50 from a collapsed position to a photographing preparation position shown in FIG. 1, that is, in a collapsible barrel drive region. The lens group drive system 50B advances respective lens group frames shown in FIG. 2.

As shown in FIG. 1, the collapsible barrel drive system 50A mainly comprises a fixed frame 1, a rotary frame 2, a helicoid ring 4 and a moving frame 5. The fixed frame 1 is fixed to and supported by a camera main body and includes a helicoid ring drive gear 7 and a drive ring 3. The rotary frame 2 advances and retracts between the collapsed position and the photographing preparation position and rotates between a wide-angle position and a telephoto position at the photographing preparation position. The helicoid ring 4 is rotatably supported by the moving frame 5 which will be described later. The moving frame 5 linearly moves between the collapsed position and the photographing preparation position together with the rotary frame 2.

The respective structural members of the collapsible barrel drive system 50A will be described in detail. The fixed frame 1 is fixed to and supported by a camera main body 51 (refer to FIG. 5). The fixed frame 1 has a linearly-moving slot 1d passing through the outer peripheral portion thereof to permit the protrusion of the moving frame 5 to be inserted thereinto as well as a helicoid female screw 1a and linearly-moving slots 1b formed in the inner peripheral portion thereof. Further, the fixed frame 1 has a drive ring support section 1c disposed at the extreme end thereof to which the drive ring 3 is rotatably mounted. The thrust position of the drive ring 3 is regulated by an abutting plate 6. Furthermore, a long gear-shaped helicoid ring drive gear 7 is rotatably supported on the outer peripheral portion of the fixed frame 1 and the tooth portion thereof is exposed to the inner peripheral portion of the fixed frame.

Note that the linearly-moving slots 1b and the respective linearly-moving slots to be described later are slots disposed in parallel with the optical-axis O of the photographing optical system.

The drive ring 3 has a zoom gear 3a and a finder gear 3b each disposed to the outer peripheral portion thereof. The zoom gear 3a is driven by being meshed with a zoom drive system (not shown) and the finder gear 3b is driven by being meshed with a finder drive system (not shown). Further, the drive ring 3 has cutout-shaped recessed sections 3c formed at the inner peripheral portion thereof.

The rotary frame 2 has linearly-moving slots 2a formed at the inner peripheral portion thereof, an inner peripheral slot 2b formed at the front end of the inner peripheral portion thereof (on a subject side) and projections 2c formed at the outer peripheral portion thereof.

The helicoid ring 4 has a helicoid male screw 4a and a drive gear 4b each formed at the outer peripheral portion thereof.

The moving frame 5 has a strobe drive projection 5a, projections 5b, 5c and 5d for linearly-moving guides, a peripheral direction guide 5e formed of the projections 5e each disposed to the outer peripheral portion thereof, a projection 5f disposed to the extreme end thereof, and a three sets of a plurality of rows of linearly-moving slots 5g formed at the inner peripheral portion thereof. The strobe drive projection 5a is inserted into the slot 1d of the fixed frame. Further, the moving frame 5 has three cam slots 5h disposed thereto, each of which passes through the outer and inner peripheral portions thereof and has an inclined slot portion inclined with respect to the optical-axis O.

In the collapsible barrel drive system 50A composed of the respective members, the helicoid ring 4 is inserted into the peripheral direction guide 5e of the moving frame 5, whereby the moving frame 5 is rotatably supported in a state in which the position thereof is regulated in an axial direction. Further, the lens group drive system 50B, which will be described later, and the lens group frame section 50C are assembled to the inner peripheral portion of the moving frame 5 so as to rotate as well as advance and retract. The moving frame 5 is inserted into the inner peripheral portion of the rotary frame 2. However, since the projection 5f is engaged with the inner peripheral slot 2b in the inserted state, the moving frame 5 is rotatably supported in a state in which the position thereof is regulated in the axial direction with respect to the rotary frame 2.

The rotary frame 2 and the moving frame 5 are inserted into the fixed frame 1 so as to linearly move in a state in which the projections 2c, 5c and 5b are inserted into the linearly-moving slots 1b and 1d. At the time, the helicoid male screw 4a of the helicoid ring 4 is meshed with the helicoid female screw 1a of the fixed frame 1 and the drive gear 4b is meshed with the helicoid ring drive gear 7, respectively.

When the moving frame 5 and the rotary frame 2 are located at a collapsed position on a film surface side in a state in which they are assembled to the fixed frame 1 (refer to FIG. 5), the rotation of the helicoid ring drive gear 7 clockwise in a B1 direction (when viewed from a subject side) causes the helicoid ring 4 to rotate counterclockwise in a C1 direction. The moving frame 5 and the rotary frame 2 are advanced thereby integrally with each other up to the photographing preparation position in a D1 direction (direction on the subject side, refer to the upper half section of FIG. 6).

In the state in which they reach the photographing preparation position, the projections 2c of the rotary frame 2 are removed from the linearly-moving slots 1b of the fixed frame 1 and engaged with the recessed sections 3c of the drive ring 3. When the drive ring 3 is rotated by the zoom drive system in an E0 direction, the rotary frame 2 is slightly rotated from the photographing preparation position in the E0 direction and reaches a wide-angle position. When the drive ring 3 is further rotated in the E0 direction, it is zoomed to a telephoto position. Note that when the drive ring 3 is rotated in an E1 direction opposite to the E0 direction, the rotary frame 2 is rotated from the zoom position to the photographing preparation position. Further, when the helicoid ring drive gear 7 is rotated in a B0 direction opposite to the B1 direction, the rotary frame 2 and the moving frame 5 can be moved to the collapsed position.

Next, the lens group drive system 50B will be described.

As shown in FIGS. 2, 3A, 3B, 4 and 7, the lens group drive system 50B is a frame member for mainly supporting a movable flare stop 15 that is advanced and retracted by being inserted into the moving frame 5. The lens group drive system 50B comprises a cam frame M11, a cam frame F12, a key ring 13 and the movable flare stop 15. The cam frame M11 is rotated together with rotary frame 2. The cam frame F12 is rotated together with the cam frame M11 and advanced and retracted through a second group frame 22. The key ring 13 has a key presser 14 secured thereto and guides the linear movement of the lens group frame. The movable flare stop 15 is a stop member which is supported by the cam frame M11 and moves linearly.

Next, the respective members constituting the lens group drive system 50B will be described in detail.

The cam frame M11 is a member which is inserted into the inner peripheral portion of the moving frame 5 so as to rotate as well as advance and retract. Disposed to the outer peripheral portion of the cam frame M11 are an outer peripheral surface 11a as a first sliding surface, three cam followers 17 each having a shaft secured by being force-fitted, three cam followers 18, a stepped side 11b as a stepped side, a stepped peripheral surface 11c, an outer end peripheral surface 11a' having a predetermined width, and a peripherally-inclined surface 11d. A convex portion 15c at the extreme end of the movable flare stop 15 slides on the outer peripheral surface 11a. The cam followers 18 are rotatably inserted into the shaft sections of the cam followers 17. The peripherally-inclined surface 11d is disposed in the vicinity of the stepped peripheral surface 11c in the peripheral direction thereof. Further, disposed to the inner peripheral portion of the cam frame M11 are an inner peripheral slot 11e located at the end thereof on the film surface side, three linearly-moving slots 11f and three second group cam slots 11g each having an inclined slot portion inclined with respect to the optical-axis O.

Note that the stepped peripheral surface 11c acts as a second sliding surface which is formed at the end on the film surface side one step lower than the outer peripheral surface 11a. The extreme end convex portions 15c of the arm sections of the movable flare stop 15 are in sliding contact with the stepped peripheral surface 11c. Note that the width of the stepped peripheral surface 11c in the axial direction thereof is set slightly larger than the width of the extreme end convex portion 15c in the axial direction so that the extreme end convex portion 15c can slide in the peripheral direction.

Further, the outer end peripheral surface 11a' is a surface having the same diameter as that of the outer peripheral surface 11a disposed in the peripheral direction of the stepped peripheral surface 11c. The outer end peripheral surface 11a' acts as a first sliding surface having a predetermined width with which the extreme end convex portions 15c of the movable flare stop 15 are in sliding contact.

The peripherally-inclined surface 11d is an inclined surface in the peripheral direction for continuously connecting the stepped peripheral surface 11c to the outer end peripheral surface 11a' (refer to FIG. 3A).

The stepped side 11b is a side vertical to the axis and located between the outer peripheral surface 11a and the stepped peripheral surface 11c (refer to FIG. 3A).

The cam frame F12 is a member which is fitted to the inner peripheral surface of the cam frame M11 so as to advance thereto and retract therefrom. Three projections 12a are disposed to the outer peripheral surface of the cam frame F12. First group three cam slots 12b, second group three cam slots 12c and a third group one cam slot 12d, each having an inclined slot portion inclined with respect to the optical-axis O are disposed to the inner peripheral surface of the cam frame F12.

The movable flare stop 15 is a member formed of a very thin sheet and has an opening 15a and three arm sections 15b disposed thereto. The opening 15a is formed at the center of the movable flare stop 15 and acts as a flare stop opening. The arm sections 15b are elastically deformable portions slightly extending inward from a direction parallel with the optical-axis O in a free state before they are mounted. Each of the arm sections 15b has the extreme end convex portion 15c, which projects in a peripheral direction, at the extreme end thereof. When the movable flare stop 15 is assembled, the arm sections 15b are elastically deformed so that the extreme end convex sections 15c are abutted against the outer peripheral surface 11a or the stepped peripheral surface 11c of the cam frame M11 by a predetermined urging force.

The key ring 13 is a thin-plate-shaped member for guiding the linear movement of the respective lens group frames. The key ring 13 includes screw holes 13a, positioning holes 13b, three sets of a plurality of rows of projections 13d formed at the outer peripheral portion thereof, slots 13e between the plurality of rows projections 13d of each set, two cutouts 13c and a linearly-moving key 13f extending in the optical-axis direction.

The width of each slot 13e is set narrower than the width of the extreme end convex portion 15c in a peripheral direction in a range it permits the arm section 15b of the movable flare stop 15 to pass therethrough. Further, the diameter of the bottom of each slot 13e is set as large as or smaller than the diameter of the stepped peripheral surface 11c of the cam frame M11 (refer to FIGS. 3A and 7).

The key presser 14 is an elastically deformable member with the annular portion thereof partially cut out. The key presser 14 includes a brim 14a formed along the outer peripheral portion thereof, two screw holes 14b, positioning pins 14c and two presser pins 14d each having a pawl-shaped locking section 14e. The positioning pins 14c are disposed near to the screw holes 14b and can be inserted into the positioning holes 13b.

In the lens group drive system 50B composed of the aforesaid members, first, the cam frame F12 is inserted into the cam frame M11 so as to slidingly advance thereinto and retract therefrom in a state that the projections 12a are fitted to the linearly-moving slots 11f on the inner peripheral surface of the cam frame M11. Further, the respective lens group frames, which will be described later, are assembled to the inner peripheral surfaces of the cam frame M11 and the cam frame F12 so as to advance thereinto and retract therefrom.

The cam frame M11, to which the lens group frames and the like are assembled, is rotatably inserted into the inner peripheral surface of the moving frame 5 of the collapsible barrel drive system 50A, and the cam followers 18 of the cam frame M11 are slidably inserted into the cam slots 5h. The cam followers 17 acting as the shaft portions of the cam followers 18 pass through the moving frame 5 and are slidably inserted into the linearly-moving slots 2a of the rotary frame 2. Therefore, the cam frame M11 is advanced and retracted in the optical axis direction by the cam slots 5h of the moving frame 5 while rotated by the rotation of the rotary frame 2 together with it.

The key presser 14 inserts the brim 14a into the inner peripheral slot 11e of the cam frame M11 in a state that the brim 14a is widened in a diametrical direction. The key ring 13 is attached to the key presser 14 in a state that it is positioned by the positioning pins 14c and the positioning holes 13b and secured through screws 16. Consequently, the key ring 13 is rotatably supported in a state that the position thereof in the axial direction is regulated by the film side end of the cam frame M11 with respect thereto.

Note that in the state in which the key ring is attached as described above, the presser pins 14d of the key presser 14 are inserted into the cutouts 13c of the key ring 13 and the locking section 14e of the presser pins 14d is engaged with the cutouts 13c, whereby the key presser 14 and the key ring 13 are held without intervals therebetween as shown in FIG. 7.

The key ring 13 is linearly advanced without being rotated because the plurality of rows of projections 13d thereof are slidably inserted into the plurality of rows of linearly-moving slots 5g of the moving frame 5 which linearly advances and retracts. Further, the linear movement of the second group frame 22 and the first group frame 21 and the third group frame 23 supported by the second group frame 22 is guided because the linearly-moving key 13f of the key ring 13 is slidably inserted into the linearly-moving guide hole 22c of the second group frame 22.

The movable flare stop 15 is mounted in a state in which the arm sections 15b thereof passe through the slots 13e of the key ring from the side of the film surface and the extreme end convex portion 15c thereof can be come into slidable contact with the outer peripheral surface 11a or the stepped peripheral surface 11c of the cam frame M11.

Next, the lens group frame section 50C will be described.

The lens group frame section 50C comprises respective lens holding frames which are incorporated in the cam frame M11 and the cam frame F12 and move linearly. The lens group frame section 50C comprises the first group frame 21, the second group frame 22, a movable follower 28, the third group frame 23 and a focusing frame 29 (refer to FIGS. 5 and 6). The first group frame 21 is advanced and retracted through the cam frame M11 and holds a first group lens 41; the second group frame 22 is guided so as to move linearly through the key ring 13 and advanced and retracted by the cam frame M11; the movable follower 28 is advanced and retracted through the cam frame F12; the third group frame 23 is advanced and retracted through the movable follower 28 and holds a third lens group 43; and the focusing frame 29 is held by the second group frame 22, linearly moved by a focusing drive system (not shown) and holds a second lens group 42.

The second group frame 22 includes three cam followers 32 and three cam followers 33 which are disposed to the outer peripheral surface thereof and three projections 22b which are disposed at the extreme end thereof. The second group frame 22 further includes a linearly-moving guide hole 22c, an axial hole 22d, a cutout 22e, a guide shaft 27 and an opening 22a, and these components are disposed to the inner peripheral surface of the second group frame 22. The linearly-moving guide hole 22c has the linearly-moving key 13f of the key ring inserted thereinto; the axial hole 22d is formed along the optical-axis direction O; the guide shaft 27 is secured and supported along the optical-axis direction O; and the opening 22a has a shutter 44 mounted therein (refer to FIG. 4).

The first group frame 21 holds the first group lens 41 in the opening 21a thereof and includes three cam followers 31 disposed to the outer peripheral surface thereof and a linearly-moving slot 21b disposed to the inner peripheral surface thereof.

The movable follower 28 is a member for restricting the positions to and from which the third group frame 23 advances and retracts, and includes a shaft hole 28a, into which the guide shaft 27 of the second group frame 22 is slidably inserted, a cam follower 28b and a locking pawl 28c for locking the third group frame 23.

The third group frame 23 is a member supported by the second group frame 22 so as to slide in a linearly moving direction, and includes guide shafts 24 and 25 which are secured thereto and supported thereby, a locked section 23b to which the locking pawl 28c of the movable follower 28 is locked and an opening where the third lens group 43 is held.

The focusing frame 29 holds the second lens group 42, is supported by the second group frame 22 so as to advance and retract, and advanced and retracted by a focusing drive system (not shown, refer to FIGS. 5 and 6).

In the lens group frame section 50C composed of the above members, the first group frame 21 is mounted on the second group frame 22 by slidably inserting the projections 22b on the outer peripheral surface of the second group frame 22 on the subject side thereof into the linearly-moving slot 21b of the first group frame 21. Further, the third group frame 23 is mounted on the second group frame 22 by slidably inserting the guide shafts 24 and 25 of the third group frame 23 into the axial hole 22d and the cutout 22e of the second group frame 22. Since a compression spring is inserted into the guide shaft 24, the third group frame 23 is always subjected to an urging force in the direction of the film surface.

Further, the movable follower 28 is mounted on the second group frame 22 by slidably fitting the shaft hole 28a thereof on the guide shaft 27 of the second group frame 22. When the third group frame 23 is not subjected to the abutting force of the camera main body 51, the locking pawl 28c of the movable follower 28 is engaged with the locked section 23b of the third group frame 23, thereby positioning the third group frame 23.

The above lens group frame section 50C is assembled to the cam frame M11 and the cam frame F12 of the above lens group drive system 50B so as to linearly advance and retract. The linearly-moving key 13f of the key ring 13, which is guided so as to linearly advance, is slidably inserted into the linearly-moving guide hole 22c of the second group frame 22. Accordingly, the first and third group frames 21 and 23 and the movable follower 28 are also supported so as to linearly advance and retract together with the second group frame 22.

Then, the cam followers 31 of the first group frame are inserted into the first group cam slots 12b of the cam frame F12 and the cam followers 32 and 33 of the second group frame are inserted into the second group cam slots 11g of the cam frame M and into the second group cam slots 12c of the cam frame F, respectively. Further, the cam follower 28b of the movable follower is inserted into the third group cam slot 12d of the cam frame F.

Therefore, as the advancing and retracting positions of the respective frame members and the like with respect to the cam frame M11, the second group frame 22 is positioned by the second group cam slots 11g of the cam frame M11, and the cam frame F12 is positioned by the second group frame 22 and the second group cam slots 12c of the cam frame F12. Further, the movable follower 28 is positioned by the third group cam slot 12d of the cam frame F, and the third group frame 23 is positioned through the locking pawl 28c of the movable follower 28.

Next, the collapsing and protruding action of the lens barrel 50 arranged as described above will be described.

When the lens barrel 50 is in a collapsed state, all the members such as the rotary frame 2 and the like are held by being collapsed in the interior of the fixed frame 1 as shown in FIG. 5. At the time, the third group frame 23 and the movable flare stop 15 are pressed by a projection 51b disposed in the vicinity of the aperture 51a of the camera main body 51 and located at a accommodating position. Note that the extreme end convex portions 15c of the movable flare stop 15 are in sliding contact with the outer peripheral surface 11a of the cam frame M11 in this state as shown in FIG. 7 and has moved forward.

To drive the lens barrel 50 from the collapsed state to a photographing preparation state, the helicoid ring drive gear 7 is rotated in the B1 direction and the helicoid ring 4 is rotated in the C1 direction. The rotary frame 2 and the moving frame 5 are moved integrally with each other in the D1 direction while guided by the linearly-moving slots 1b by the rotation of the helicoid ring drive gear 7 and the helicoid ring 4, whereby they are protruded from the collapsed position to the photographing preparation position (refer to the upper half section of FIG. 6). In this state, the moving frame 5 remains fitted to the linearly-moving slots 1d and 1b. However, the rotary frame 2 can be rotated by the drive ring 3 because the projections 2c thereof is released from the linearly-moving slots 1b and fitted to the recessed sections 3c of the drive ring 3.

When the drive ring 3 is further driven from the photographing preparation state by the zoom drive system by a slight angle in the E0 direction, the lens barrel 50 is set to a wide-angle state as shown in the upper half section of FIG. 6.

In the driving process from the collapsed state to the photographing preparation state and the wide-angle state, the first and second group frames 22 and 23 are protruded together with the rotary frame 2 and the moving frame 5. The third group frame 23 is relatively separated rearward from the cam frame M11 and the second group frame 22 by the urging force of a compression spring 26 and relatively retracted up to a position corresponding to the wide-angle state where the locking pawl 28c of the movable follower 28 is fitted to the locked section 23b of the third group frame 23.

Further, in the above drive process, the movable flare stop 15 is pressed by the third group frame 23 which retracts to the cam frame M11 and relatively retracted similarly. At the time, the extreme end convex portions 15c of the arm sections 15b reach on the outer peripheral surface 11a, at the end of the cam frame M11 shown in FIG. 3A.

When the cam frame M11 is slightly rotated in the E0 direction up to the wide-angle position, it slides on and moves downward along the continuously inclined surface 11d and reaches on the stepped peripheral surface 11c (FIG. 3B). The movable flare stop 15 is located at a predetermined relative position with respect to the cam frame M11 and acts as an normal flare stop.

The lens barrel 50 is driven from the wide-angle state to the telephoto state by rotating the drive ring 3 in the E0 direction and rotating the rotary frame 2 in the same direction (refer to the lower half section of FIG. 6). That is, the cam frame M11 is rotated by the rotation of the rotary frame 2 in the E0 direction and protruded along the cam slots 5h of the moving frame 5. In addition, the cam frame F12 is also rotated by the linearly-moving slots 11f together with the cam frame M11 and the position to which it is protruded is determined through the cam followers 33 of the second group frame 22 engaged with the cam slots 12c.

The second group frame 22 is protruded to a position corresponding to the telephoto state by the second group cam slots 11g of the cam frame M11 engaged with the cam followers 32 in a state in which the linear movement thereof is guided by the key ring 13. The first group frame 21 is protruded to a position corresponding to the telephoto position similarly by the first group cam slots 12b of the cam frame F12 engaged with the cam followers 31. Further, since the movable follower 28 is positioned by the third group cam slot 12d of the cam frame F12, the third group frame 23 is positioned at a position corresponding to the telephoto state by the locking pawl 28c of the movable follower 28 similarly.

While the cam frame M11 is rotated as well as advanced and retracted between the wide-angle state and the telephoto state, the movable flare stop 15 is held by the grooves 13e of the key ring 13 without being rotated, and the extreme end convex portions 15c thereof are in sliding contact with the stepped peripheral surface 11c in a state in which the extreme end convex portion 15c is sandwiched between the stepped side 11b and the sides of the grooves 13e of the key ring 13. Consequently, the movable flare stop 15 is reliably held at a position apart from the cam frame M11 by a predetermined distance and acts as the normal flare stop.

Next, when the lens barrel 50 is to be driven from the wide-angle state to the photographing preparation state and further to the collapsed state, the drive ring 3 is rotated in the E1 direction once to set the lens barrel 50 to the photographing preparation state. In this state, the first and second group frames 21 and 22 are protruded into the moving frame 5. The third group frame 23 is still located at a relatively retracted position with respect to the cam frame M11 (refer to the upper half section of FIG. 6). Further, the extreme end convex portions 15c of the arm sections 15b of the movable flare stop 15 slide from the stepped peripheral surface 11c to the continuously inclined surface lid and located on the outer end peripheral surface 11a because the cam frame M11 is rotated in the E1 direction (refer to FIG. 3A).

Thereafter, when the helicoid ring drive gear 7 is rotated in a B0 direction to thereby rotate the helicoid ring 4 in a C0 direction, the rotary frame 2 is retracted in a D0 direction together with the moving frame 5, whereby the projections 2c of the rotary frame 2 engaged with the drive ring 3 is released therefrom. When the rotation of the helicoid ring 4 is further continued, the rotary frame 2 is moved in a D0 direction together with the moving frame 5 and retracted to a collapsed position where it is accommodated in the fixed frame 1 (refer to FIG. 5).

The third group frame 23 and the movable flare stop 15 are pressed by the projection 51b of the camera main body 51 and relatively advanced against the urging force of the compression spring 26. Then, the third group frame 23 is accommodated in the interior of the second group frame 22 (refer to FIG. 5). In contrast, the movable flare stop 15 is also advanced relatively in the optical-axis direction with respect to the cam frame M11, and the extreme end convex portions 15c of the arm sections 15b slide forward on the outer peripheral surface 11a from the outer end peripheral surface 11a' of the cam frame M11, whereby the movable flare stop 15 is accommodated (refer to FIG. 5).

According to the stop device assembled to the lens barrel 50 described above, the relative position of the movable flare stop 15 in the optical-axis direction is not changed with respect to the cam frame M11 so that a good flare stop state can be obtained at all times. Further, the movable flare stop 15 is reliably accommodated in the cam frame M11 even in the collapsed state, an occupied space is reduced the lens barrel can be effectively reduced in size.

As described above, according to the stop device of the present invention, the relative distance between the stop member and the frame members for supporting it can be accurately maintained, further the area occupied thereby can be reduced and the size of the lens barrel to which the stop device is assembled can be reduced.

In addition, when the frame member is moved in the optical-axis direction and in the rotating direction, since the positions of the ends of the arms of the stop member are regulated by the stepped surface of the frame member, the relative distance between the frame member and stop member can be accurately maintained, whereby an excellent stop action can be obtained.

What is claimed is:

1. A stop device comprising:
   a stop member for permitting a desired photographing light beam to pass therethrough, said stop member including an arm section attached at a first end to the stop member, said arm section extending in an optical-axis direction, and terminating in an enlarged second end; and
   a frame member having a slot therein that receives the portion of the arm section intermediate the ends thereof for regulating advancing and retracting movements of said stop member in said optical-axis direction.

2. A stop device according to claim 1, wherein the slot extends peripherally of said frame member.

3. A stop device according to claim 1, wherein said stop member shields harmful light.

4. A stop device according to claim 1, wherein the portion of the arm section intermediate the ends thereof is slidable in the slot.

5. A stop device comprising:
   a stop member mounted on an optical axis of a photographing lens, said stop member permitting a desired photographing light beam to pass therethrough, said stop member including an arm section attached at a first end to the stop member, said arm section extending in said optical-axis direction, and terminating in an enlarged second end; and
   a frame member having a slot therein that receives the portion of the arm section intermediate the ends thereof for regulating advancing and retracting movements of said stop member in said optical-axis direction, said frame member being capable of relatively moving in the optical-axis direction of said stop member and said photographing lens and rotating about the optical-axis direction thereof.

6. A stop device according to claim 5, wherein the slot in said frame member regulates advancing and retracting movements of said stop member in said optical-axis direction by abutment of the enlarged second end of the arm section against marginal portions of said slot.

7. A stop device comprising:
   a stop member having a plurality of arm section and permitting a desired photographing light beam to pass therethrough; and
   a frame member having a plurality of slots for regulating advancing and retracting movements of said stop member in an optical-axis direction by respectively abutting against an end of one of the arm sections, said frame member being capable of relatively moving in the optical-axis direction of the stop member and a photographing lens and about the optical-axis direction thereof; and wherein the arm sections are elastic members, each having an urging force in the optical-axis direction and in a vertical direction, respectively.

8. A stop device comprising:
   a stop member having arm sections and permitting a desired photographing light beam to pass therethrough;
   a frame member having first and second sliding surfaces on which ends of the arm sections are slidable, respectively, and having an inclined surface for continuously connecting the sliding surfaces and regulating the advancing and retracting movement of said stop member in an optical-axis direction by the abutment of the ends against the second sliding surface.

9. A stop device according to claim 8, wherein the relative distance between said stop member and said frame member in the optical-axis direction is changed when the lens barrel is moved from the collapsed position to the photographing preparation position.

10. A stop device according to claim 9, wherein the relative distance is increased.

11. A stop device according to claim 8, wherein the relative distance between said stop member and said frame member in the optical-axis direction is not changed when the lens barrel is moved from the first photographing magnification position to the second photographing magnification position.

12. A stop device disposed to a lens barrel capable of protruding and collapsing in an optical-axis direction comprising:
   a stop member having arm sections including convex portions at the extreme ends thereof and permitting a desired photographing light beam to pass therethrough; and
   a frame member having a first sliding surface on which the convex portions can slide, a second sliding surface, on which the convex portions can slide, having a step with respect to the first sliding surface and an inclined surface for continuously connecting the sliding surfaces and capable of moving in the optical-axis direction of the lens barrel about the optical-axis thereof, wherein said stop member slides on the first sliding surface when the lens barrel moves from a collapsed position to a photographing preparation position, slides and falls on the inclined surface and reaches the second sliding surface when the lens barrel moves from the photographing preparation position to a first photographing magnification position, and slides on the second sliding surface when the lens barrel moves from the first photographing magnification position to a second photographing magnification position.

13. A stop device disposed to a lens barrel capable of protruding and collapsing in an optical-axis direction comprising:

a stop member having arm sections including convex portions at the extreme ends thereof and permitting a desired photographing light beam to pass therethrough; and a frame member having a first sliding surface on which the convex portions can slide, a second sliding surface, on which the convex portions can slide, having a step with respect to the first sliding surface and an inclined surface for continuously connecting the sliding surfaces and capable of moving in the optical-axis direction of the lens barrel about the optical-axis thereof, wherein said stop member slides on the first sliding surface in the optical-axis direction when the lens barrel moves from a collapsed position to a photographing preparation position, slides and falls on the inclined surface about the optical-axis and reaches the second sliding surface when the lens barrel moves from the photographing preparation position to a first photographing magnification position, and slides on the second sliding surface about the optical-axis when the lens barrel moves from the first photographing magnification position to a second photographing magnification position.

14. A stop device disposed to a lens barrel capable of protruding and collapsing in an optical-axis direction comprising:

a stop member having arm sections including convex portions at the extreme ends thereof and permitting a desired photographing light beam to pass therethrough;

a frame member having a first sliding surface on which the convex portions can slide, a second sliding surface, on which the convex portions can slide, having a step with respect to the first sliding surface and an inclined surface for continuously connecting the sliding surfaces and capable of moving in the optical-axis direction of the lens barrel about the optical-axis thereof; and a ring member for guiding the linear movement of the lens barrel as well as having a slot through which the arm sections of said stop member passes wherein said stop member slides on the first sliding surface in the optical-axis direction when the lens barrel moves from a collapsed position to a photographing preparation position, slides and falls on the inclined surface about the optical-axis and reaches the second sliding surface when the lens barrel moves from the photographing preparation position to a first photographing magnification position, and slides on the second sliding surface about the optical-axis when the lens barrel moves from the first photographing magnification position to a second photographing magnification position.

15. A stop device according to claim 14, wherein said ring member prevents the removal of said stop member in the direction in which the lens barrel is collapsed.

16. A stop device comprising:

a stop member having at least an elastic arm section and permitting a desired photographing light beam to pass therethrough;

a frame member having a first and a second sliding surface on which the elastic arm section slides and having a ramp for connecting the sliding surfaces, wherein the elastic arm section slides on the ramp when the frame member rotates relative to the stop member and the stop member is movable relative to the frame member in an optical-axis while the elastic arm section is on the first sliding surface, and the stop member is not movable relative to the frame member while the elastic arm section is on the second sliding surface.

17. A stop device comprising:

a stop member having at least an arm section and permitting a desired photographing light beam to pass therethrough;

a frame member having first and second sliding surfaces on which the arm section slides and having third and fourth surfaces which are perpendicular to an optical-axis direction and between which the second sliding surface and the arm section are located and which restrain the stop member from moving relative to the frame member in the optical-axis direction;

wherein rotation of the frame member relative to the stop member moves the arm section between the first and the second surfaces, the stop member being movable relative to the frame member in the optical-axis direction while the arm section is on the first sliding surface, the stop member not being movable relative to the frame member while the arm section is on the second sliding surface.

18. A stop device comprising:

a stop member for permitting a desired photographing light beam to pass therethrough, said stop member including a plurality of arm sections each attached at a first end thereof to the stop member, said arm sections extending in an optical-axis direction, and terminating in enlarged second ends; and a frame member having a plurality of slots therein that receive the portions of the respective arm section intermediate the ends thereof for regulating advancing and retracting movements of said stop member in said optical-axis direction.

19. A stop device according to claim 18, wherein the slots extend peripherally of said frame member.

20. A stop device according to claim 18, wherein the portions of the arm sections intermediate the ends thereof are slidable in the respective slots.

21. A stop device according to claim 18, wherein said frame member includes a body section beyond said slot on which the second ends of the arm portions are slidable.

22. A stop device according to claim 21, wherein said arm portions are resilient members that apply forces on said body section in a direction perpendicular to the optical axis direction.

23. A stop device comprising:

a stop member mounted on an optical axis of a photographing lens, said stop member permitting a desired photographing light beam to pass therethrough, said stop member including a plurality of arm sections each attached at a first end thereof to the stop member, said arm sections extending in said optical-axis direction, and terminating in enlarged second ends; and a frame member having a plurality of slots therein that receive the portions of the respective arm section intermediate the ends thereof for regulating advancing and retracting movements of said stop member in said optical-axis direction, said frame member being capable of relatively moving in the optical-axis direction of said stop member and said photographing lens and rotating about the optical-axis direction thereof.

24. A stop device according to claim 3, wherein the slots in said frame member regulate advancing and retracting movements of said stop member in said optical-axis direction by abutment of the enlarged second ends of the respective arm sections against marginal portions of said slots.

* * * * *